(12) United States Patent
Chan et al.

(10) Patent No.: US 10,268,863 B2
(45) Date of Patent: Apr. 23, 2019

(54) CAPACITIVE SENSING DEVICE, FINGERPRINT SENSING DEVICE AND METHOD FOR MANUFACTURING CAPACITIVE SENSING DEVICE

(71) Applicant: ILI TECHNOLOGY CORP., Hsinchu County (TW)

(72) Inventors: Ping-Yu Chan, Hsinchu Hsien (TW); Kai-Ting Ho, Hsinchu Hsien (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 165 days.

(21) Appl. No.: 15/351,692

(22) Filed: Nov. 15, 2016

(65) Prior Publication Data

US 2017/0193265 A1 Jul. 6, 2017

(30) Foreign Application Priority Data

Dec. 30, 2015 (TW) .............................. 104144446 A (51) Int. Cl.
*G06K 9/20* (2006.01)
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0416* (2013.01); *G06F 2203/04103* (2013.01); *G06F 2203/04106* (2013.01); *G06F 2203/04112* (2013.01)

(58) Field of Classification Search
CPC .................................................... G06K 9/0002
See application file for complete search history.

(56) References Cited

U.S. PATENT DOCUMENTS

| | | | | |
|---|---|---|---|---|
| 9,465,491 B2 * | 10/2016 | Shaikh | ................. | G06K 9/0002 |
| 2013/0135247 A1 * | 5/2013 | Na | ......................... | G06F 21/32 |
| | | | | 345/174 |
| 2017/0061187 A1 * | 3/2017 | Wen | ..................... | G06K 9/0002 |
| 2017/0076130 A1 * | 3/2017 | Kravets | ............... | G06K 9/0008 |
| 2017/0287797 A1 * | 10/2017 | Wang | ..................... | H01L 23/32 |

FOREIGN PATENT DOCUMENTS

CN 104021371 9/2014

* cited by examiner

*Primary Examiner* — Brian Werner
(74) *Attorney, Agent, or Firm* — JCIPRNET (57) ABSTRACT

A capacitive sensing device includes: a substrate; a touch sensing electrode group, disposed above the substrate; a fingerprint sensing electrode group, disposed above the substrate; and a capacitive sensing integrated circuit, electrically connected to the touch sensing electrode group and the fingerprint sensing electrode group, sensing a capacitance change in the touch sensing electrode group to generate a touch control instruction, and sensing a capacitance change in the fingerprint sensing electrode group to generate a fingerprint pattern.

14 Claims, 8 Drawing Sheets

CAPACITIVE SENSING DEVICE, FINGERPRINT SENSING DEVICE AND METHOD FOR MANUFACTURING CAPACITIVE SENSING DEVICE

This application claims the benefit of Taiwan application Serial No. 104144446, filed Dec. 30, 2015, the subject matter of which is incorporated herein by reference.

BACKGROUND OF THE INVENTION

Field of the Invention

The invention relates in general to a capacitive sensing device, and more particularly, to a capacitive sensing device applied to a portable electronic device or a flat display device.

Description of the Related Art

Entering a control instruction on a portable electronic device or a flat display device by means of a touch control gesture is a widely accepted and common application. In addition, user identity verification using fingerprint recognition is a solution that is gradually accepted and becoming more extensively applied for portable electronic devices. However, in current technical means, both of the requirements above need individual sensing units and corresponding control circuits. Therefore, it is a primary object of the present invention to develop a sensing device and design satisfying both of the requirements above.

SUMMARY OF THE INVENTION

According to an embodiment of the present invention, a capacitive sensing device is provided. The capacitive sensing device includes: a substrate; a touch sensing electrode group, disposed above the substrate; a fingerprint sensing electrode group, disposed above the substrate; and a capacitive sensing integrated circuit, electrically connected to the touch sensing electrode group and the fingerprint sensing electrode group, sensing a capacitance change in the touch sensing electrode group to generate a touch control instruction, and sensing a capacitance change in the fingerprint sensing electrode group to generate a fingerprint pattern.

In the capacitive sensing device according to one embodiment of the present invention, the substrate is a transparent substrate including a touch sensing electrode distribution region, in which the touch sensing electrode group is distributed. The touch sensing electrode group includes an insulation layer and two layers of conductive structures.

In the capacitive sensing device according to one embodiment of the present invention, the substrate includes a fingerprint sensing electrode distribution region, in which the fingerprint sensing electrode group is distributed.

In the capacitive sensing device according to one embodiment of the present invention, the touch sensing electrode group and/or the fingerprint sensing electrode group at least include(s) three layers of structures, with the middle-layer structure being an insulation layer and upper and lower layers being conductive structures.

In the capacitive sensing device according to one embodiment of the present invention, both of the conductive structures are implemented by metal mesh layers or by transparent electrode layers.

In the capacitive sensing device according to one embodiment of the present invention, the two layers of conductive structures are implemented by a metal mesh layer and a transparent electrode layer.

In the capacitive sensing device according to one embodiment of the present invention, an electrode distribution density of the fingerprint sensing electrode group is greater than an electrode distribution density of the touch sensing electrode group, and a position of the fingerprint sensing electrode group overlaps a position of the touch sensing electrode group.

In the capacitive sensing device according to one embodiment of the present invention, the substrate includes a recess above the fingerprint sensing electrode group. A metal ring is formed on a sidewall of the recess. The recess is electrically connected to the capacitive sensing integrated circuit and is thus provided with a fixed voltage.

In the capacitive sensing device according to one embodiment of the present invention, the touch sensing electrode group, the fingerprint sensing electrode group and the capacitive sensing integrated circuits are all disposed on a same surface or above a same surface of the substrate.

In the capacitive sensing device according to one embodiment of the present invention, the fingerprint sensing electrode includes: a first conductive structure, disposed above the substrate, including a plurality of parallel conducting lines; a second conductive structure, disposed above the substrate; an insulation layer, disposed between the first conductive structure and the second conductive structure; and at least one floating conductive structure, made of the same material as the second conductive structure but not being in electrical contact with the second conductive structure, disposed on the same side of the insulation layer as the second conductive layer and above a gap of the parallel conducting lines.

According to one embodiment of the present invention, the capacitive sensing device further includes a metal mesh segment disposed on the first conductive structure and being in electrical contact with the first conductive structure.

In the capacitive sensing device according to one embodiment of the present invention, the fingerprint sensing electrode group includes: a first conductive structure, disposed above the substrate, including a plurality of parallel conducting lines; a second conductive structure, disposed above the substrate; an insulation layer, disposed between the first conductive structure and the second conductive structure; at least one auxiliary conductive structure, made of the same material as the second conductive structure and being in electrical contact with the second conductive structure, disposed on the same side of the insulation layer as the second conductive structure and located above a gap of the parallel conducting lines.

According to one embodiment of the present invention, the capacitive sensing device further includes a metal mesh segment disposed on the first conductive structure and being in electrical contact with the first conductive structure.

The present invention further provides a capacitive sensing device. The capacitive sensing device includes: a substrate; a first conductive structure, disposed above a surface of the substrate, including a plurality of parallel conducting lines; a second conductive structure, disposed above the substrate; an insulation layer, disposed between the first conductive structure and the second conductive structure; and an auxiliary conductive structure, being in electrical contact with the second conductive structure, disposed on the same side of the insulation layer as the second conductive structure and located above a gap of the parallel conducting lines.

The present invention further provides a method for manufacturing a capacitive sensing device. The method includes: providing a substrate; completing a touch sensing electrode group and a finger sensing electrode group above a surface of the substrate using a same manufacturing process; and providing a capacitive sensing integrated circuit and electrically connecting the capacitive sensing integrated circuit with the touch sensing electrode group and the fingerprint sensing electrode group, the capacitive sensing integrated circuit sensing a capacitance change in the touch sensing electrode group to generate a touch control instruction and sensing a capacitance change in the fingerprint sensing electrode group to generate a fingerprint pattern.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
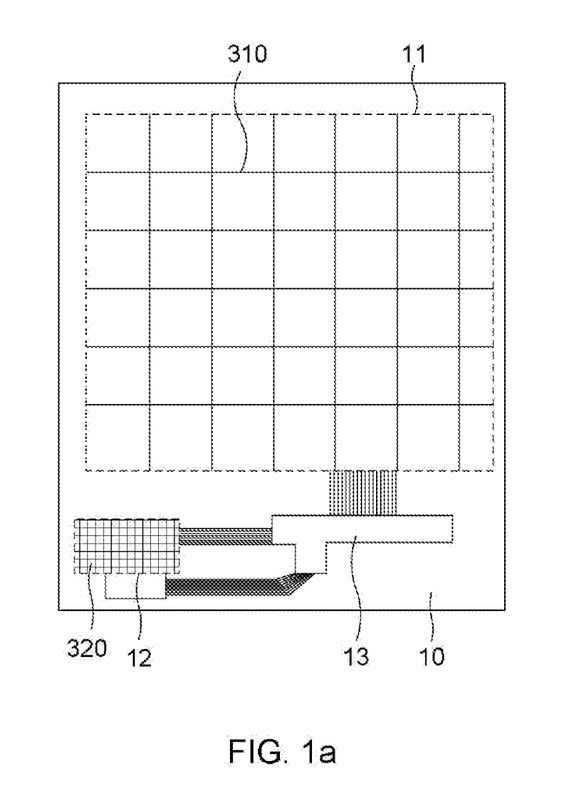
FIG. 1a is a function block diagram of a capacitive touch sensing device with a fingerprint recognition function according to an embodiment of the present invention.

FIG. 1a shows a function block diagram of a capacitive touch sensing device with a fingerprint recognition function according to an embodiment of the present invention. A substrate 10 includes a touch sensing electrode distribution region 11 and a fingerprint sensing electrode distribution region 12. The sensing for a touch position on the touch sensing electrode distribution region 11 and the sensing for a fingerprint pattern on the fingerprint sensing electrode distribution 12 are both implemented by capacitive touch sensing technologies. Thus, in the present invention, a capacitive sensing integrate circuit 13 is used to calculate the touch position on the touch sensing electrode distribution region 11 and to construct the fingerprint pattern on the fingerprint sensing electrode distribution 12; that is, the sensing for the touch position and that for the fingerprint pattern are achieved using the same integrated circuit chip. In one embodiment, the capacitive sensing integrated circuit 13 senses a capacitance change of a touch sensing electrode group included in the touch sensing electrode distribution region 11 to generate a touch sensing instruction, and a capacitance change of a fingerprint sensing electrode group included in the fingerprint sensing electrode distribution region 12 to generate a fingerprint pattern. Further, due to different resolutions required for the sensing of the touch position and the sensing for the fingerprint pattern, a distribution density of a touch sensing electrode group 310 included in the touch sensing electrode distribution region 11 differs from a distribution density of a fingerprint sensing electrode group 320 included in the fingerprint sensing electrode distribution region 12, with the electrode distribution density of the fingerprint sensing electrode group 320 obviously being greater than the electrode distribution density of the touch sensing electrode group 310. In one embodiment, when the present invention is applied to a flat display or any electronic device with a flat display, the substrate 10 is a transparent substrate, e.g., common glass or acrylic. The touch sensing electrode distribution region 11 is located in a display region of the flat display, whereas the fingerprint sensing electrode distribution region 12 is located outside the display region to prevent over-dense circuit routing wires from affecting the visibility of the display region.

Figure 1B:
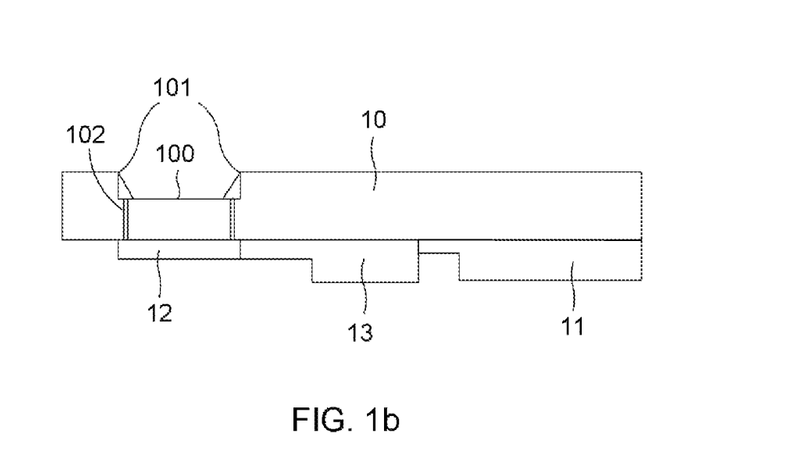
FIG. 1b is a section view of a capacitive touch sensing device with a fingerprint recognition function according to an embodiment of the present invention.

FIG. 1b shows a section view of the above capacitive touch sensing device with a fingerprint recognition function. On the substrate 10 is a predetermined region 100, which is located above the fingerprint sensing electrode distribution region 12 and is for prompting a user finger to be placed therein to easily complete positioning. For example, the predetermine region 100 may include a pre-defined region or a recess. Further, the pre-defined region may be a rough surface or a surface printed with different colors. In this embodiment, a recess is used as an example for illustration. The thickness of the substrate 10 is approximately 0.3 mm, and the thickness of the bottom of the recess is reduced to approximately 0.2 mm. A distance between a finger and the fingerprint sensing electrode distribution region 12 is closer than the thickness of the substrate 10, such that a fingerprint image sensed can be clearer to increase the recognition rate. In the present invention, a metal ring 101 may be formed on a sidewall of the recess, and is electrically connected to the capacitive sensing integrated circuit 13 at the other side through a via 102 or a routing wire. The capacitive sensing integrated circuit 13 provides a fixed voltage to the metal ring 101 to reduce possible noise generated during fingerprint sensing. As shown in the drawing, the touch sensing electrode distribution region 11, the capacitive integrated circuit 13 and the fingerprint sensing electrode distribution region 12 are located at the same side of the substrate 10. Alternatively, in response to differences in product designs, for example, the capacitive sensing integrated circuit 13 may also be disposed at one side of the substrate 10, whereas the touch sensing electrode distribution region 11 and the fingerprint sensing electrode distribution region 12 may be disposed at the other side of the substrate 10.

Figure 2A:
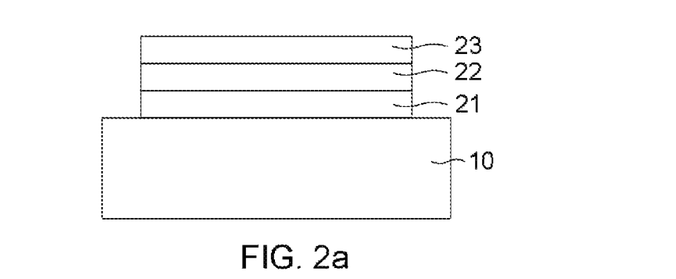
FIG. 2a is a partial section view of a touch sensing electrode distribution region and a fingerprint sensing electrode distribution according to an embodiment of the present invention.
Figure 2B:
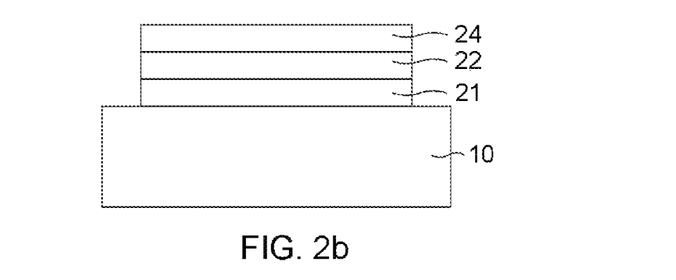
FIG. 2b is a partial section view of a touch sensing electrode distribution region and a fingerprint sensing electrode distribution according to an embodiment of the present invention.
Figure 2C:
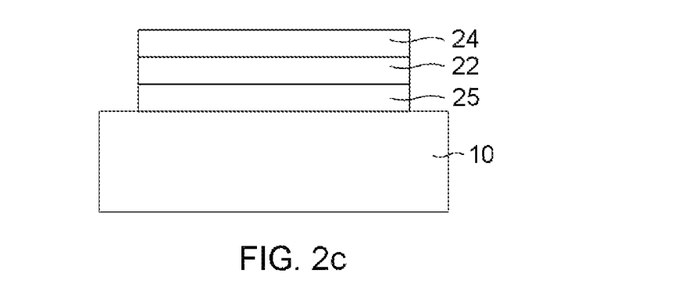
FIG. 2c is a partial section view of a touch sensing electrode distribution region and a fingerprint sensing electrode distribution according to an embodiment of the present invention.

FIG. 2a to FIG. 2c are partial section views of the touch sensing electrode distribution region 11 and the fingerprint sensing electrode distribution region 12 according to different embodiment of the present invention. In FIG. 2a, three layers of structures are sequentially stacked on the substrate 10—a first metal mesh layer 21, an insulation layer 22, and a second metal mesh layer 23, with the metal mesh layers mostly completed by a silver paste material.

Referring to FIG. 2b, three layers of structures are sequentially stacked on the substrate 10—the first metal mesh layer 21, the insulation layer 22, and a second transparent electrode layer 24.

Referring to FIG. 2c, three layers of structures are sequentially stacked on the substrate 10—a first transparent electrode layer 25, the insulation layer 22, and the second transparent electrode layer 24. As shown in FIG. 1b, because the touch sensing electrode distribution region 11 and the fingerprint sensing electrode distribution region 12 are located at the same side of the substrate 10, by appropriately designing a mask and causing the upper and lower conductive layers and the middle insulation layer of the touch sensing electrode group 310 and the fingerprint sensing electrode group 320 to have substantially the same thickness, the touch sensing electrode distribution region 11 and the fingerprint sensing electrode distribution region 12 may simultaneously form three-layer stacks as shown in FIG. 2a to FIG. 2c. Therefore, in the present invention, the touch sensing electrode group 310 in the touch sensing electrode distribution region 11 and the fingerprint sensing electrode group 320 in the fingerprint sensing electrode distribution region 12 can be completed together in the same manufacturing process. Compared to the prior art in which touch sensing electrodes and fingerprint sensing electrodes are separately formed in different manufacturing processes, the present invention achieves effects of reducing both production steps and costs. For example, by applying metal on the entire substrate 10 and removing excessive components using yellow light lithography process, the touch sensing electrode group 310 in the touch sensing electrode distribution region 11 and the fingerprint sensing electrode group 320 in the fingerprint sensing electrode distribution region 12 can be formed at the same time. Corresponding relationships of the three-layer structures in FIG. 2a to FIG. 2c and electrode patterns in the fingerprint sensing electrode group in the fingerprint sensing electrode distribution region 12 will be described in detail with reference to FIG. 4a to FIG. 4e shortly.

Figure 3A:
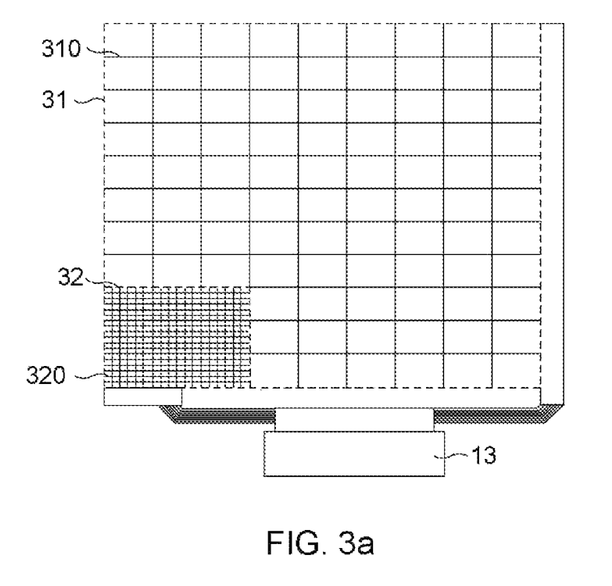
FIG. 3a is a function block diagram of a capacitive touch sensing device with a fingerprint recognition function according to another embodiment of the present invention.

FIG. 3a shows a function block diagram of a touch sensing device with a fingerprint recognition function according to another embodiment of the present invention. A difference of the embodiment in FIG. 3a from the embodiment in FIG. 1a is that, a fingerprint sensing electrode distribution region 32 of this embodiment overlaps in a touch sensing electrode distribution region 31, and does not occupy an addition wire routing region given that a routing density of a fingerprint sensing electrode group 320 and a touch sensing electrode group 310 that overlap each other does not affect the visibility of the display region. Similarly, the same capacitive sensing integrated circuit 13 is used to complete the sensing for a touch position on the touch sensing electrode distribution region 31 and the sensing for a fingerprint pattern on the fingerprint sensing electrode distribution region 32, thereby even better achieving objects of reducing manufacturing steps and costs. Instead of separately disposing the fingerprint sensing electrode group 320 and the touch sensing electrode group 310, a plurality of fingerprint sensing electrodes may also be used as one touch sensing electrode. Thus, by changing the sensing method of the capacitive sensing integrated circuit 13, the fingerprint sensing electrode distribution region 32 may also perform touch sensing.

Figure 3B:
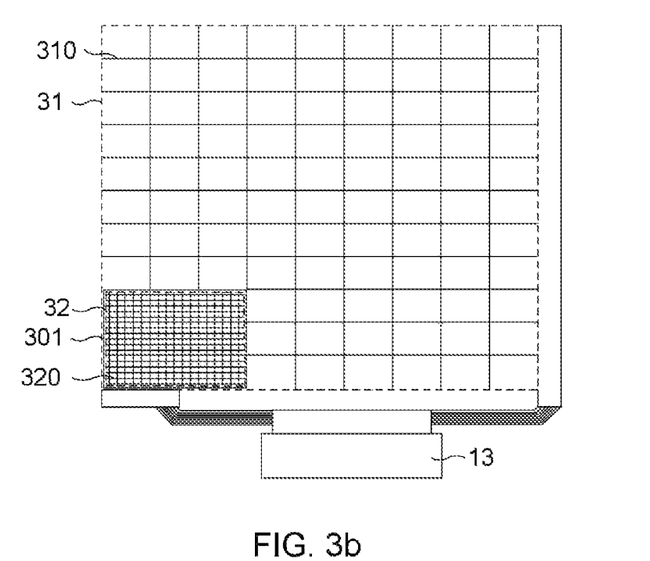
FIG. 3b is a function block diagram of a capacitive touch sensing device with a fingerprint recognition function according to another embodiment of the present invention.

FIG. 3b shows a function block diagram of a touch sensing device with a fingerprint recognition function according to another embodiment of the present invention. Referring to FIG. 3b, a difference of this embodiment from that in FIG. 3a is that, a metal ring 301 is disposed to surround edges of the fingerprint sensing electrode distribution region 32 and is electrically connected to the capacitive sensing integrated circuit 13 through a routing wire. The capacitive sensing integrated circuit 13 provides a fixed voltage to the metal ring 301 to alleviate possible noise generated during fingerprint sensing.

Figure 4A:
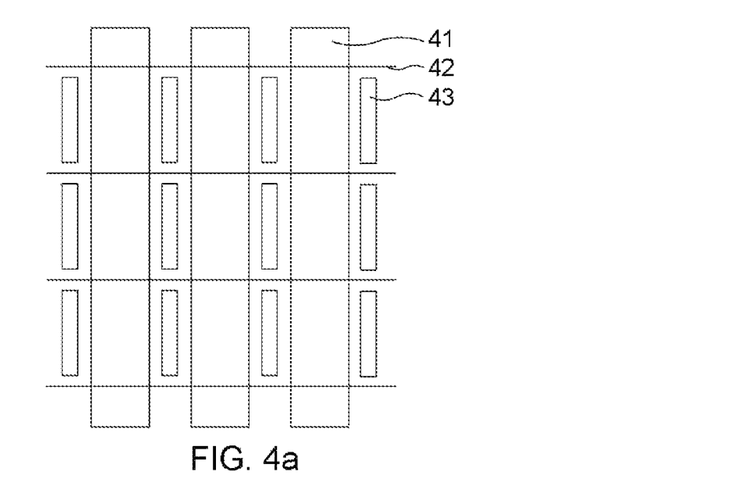
FIG. 4a is a schematic diagram of electrode patterns of a fingerprint sensing electrode group according to an embodiment of the present invention.

FIG. 4a to FIG. 4e show schematic diagrams of electrode patterns of a fingerprint sensing electrode group according to different embodiments of the present invention. For simplicity, only the upper and lower layers of conductive structures that are used to complete sensing electrodes in the three-layer structures in FIG. 2a to FIG. 2c, but not the substrate 10 and the insulation layer 22, are depicted. Referring to FIG. 4a, a first conductive structure 41 farther away from the surface of the substrate 10 is a transparent electrode (equivalent to the second transparent electrode layer 24 in FIG. 2b and FIG. 2c), and includes multiple parallel large-linewidth conducting lines. A second conductive structure 42 closer to the surface or even on the surface of the substrate 10 is a metal mesh (equivalent to the first metal mesh layer 21 in FIG. 2a and FIG. 2b). As the material of the metal mesh has lower resistance, the linewidth of the second conductive structure 42 may be reduced to a certain level under the premise that the visibility of the display region in the display device is not affected. However, to reinforce the capacitive sensing capability, in this embodiment, while screen printing the second conductive structure 42, an auxiliary conductive structure 43 made of the metal mesh is also formed above a gap between adjacent first conductive structures 41. That is to say, the second conductive structure 42 and the auxiliary conductive structure 43 are substantially located on the same plane and may be formed by the same manufacturing process. The auxiliary conductive structure 43, the second conductive structure 42 and the first conductive structure 41 are not connected to one another and are kept floating. However, the auxiliary conductive structure 43 may use an addition finger to form a capacitive coupling path to the first conductive structure 41 and the second conductive structure 42, hence reinforcing the effect of capacitive sensing.

Figure 4B:
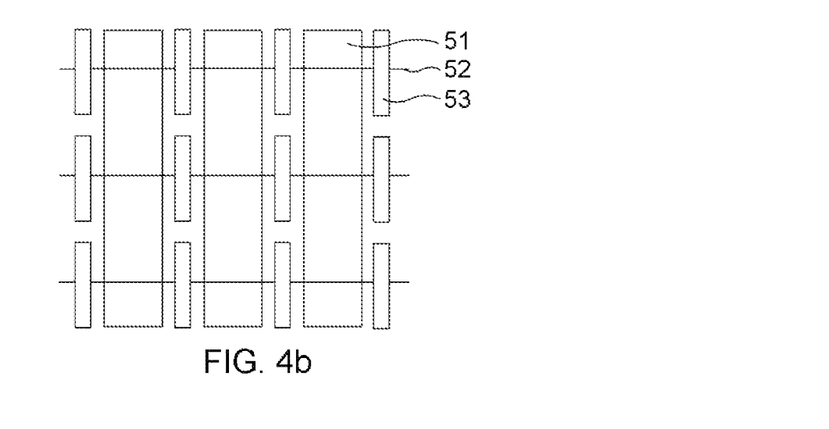
FIG. 4b is a schematic diagram of electrode patterns of a fingerprint sensing electrode group according to an embodiment of the present invention.

Referring to FIG. 4b, similar to FIG. 4a, a first conductive structure 51 farther away from the surface of the substrate 10 is a transparent electrode (equivalent to the second transparent layer 24 in FIG. 2b and FIG. 2c), and includes multiple large-linewidth parallel conducting lines. A second conductive structure 52 closer to the surface or even on the surface of the substrate 10 is a metal mesh (equivalent to the first metal mesh layer 21 in FIG. 2a and FIG. 2b). To reinforce the capacitive sensing capability, while screen printing the second conductive structure 52, an auxiliary conductive structure 53 made of the metal mesh is formed above a gap between adjacent first conductive structures 51. That is to say, the second conductive structure 52 ad the auxiliary 53 are substantially located on the same plane, and may be formed by the same manufacturing process. Different from FIG. 4a, the auxiliary conductive structure 53 is electrically connected to the second conductive structure 52 but not to the first conductive structure 51. One main purpose of the above connection is increasing an adjacent length between the first conductive structure 52 and the first conductive structure 51 to reinforce the capacitive coupling effect between the first conductive structure 51 and the second conductive structure 52, thereby reinforcing the effect of capacitive sensing.

Figure 4C:
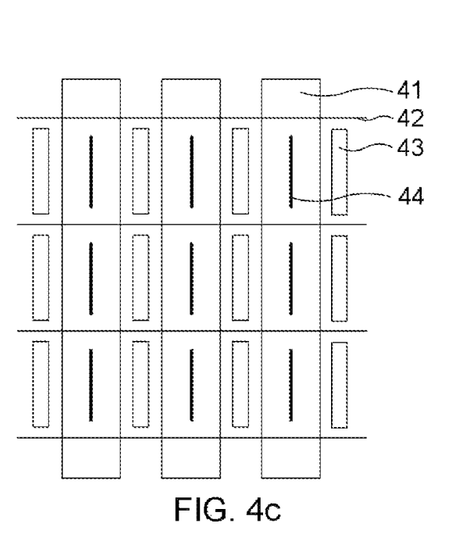
FIG. 4c is a schematic diagram of electrode patterns of a fingerprint sensing electrode group according to an embodiment of the present invention.

Referring to FIG. 4c, the electrode pattern is based on that in FIG. 4a, with one difference being that, after the first conductive structure 41 made of a transparent electrode material is formed, a printed metal mesh segment 44 is first formed on the surface of the first conductive structure 41 to reduce the overall resistance of the first conductive structure 41. The remaining parts are identical to the corresponding parts in FIG. 4a, and shall be omitted herein.

Figure 4D:
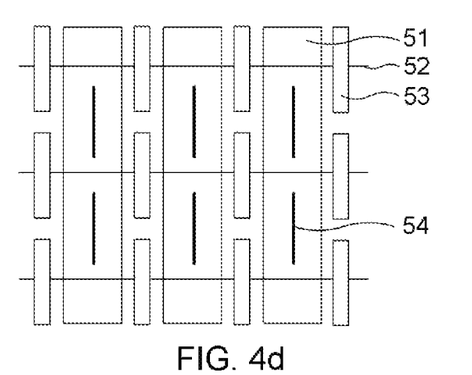
FIG. 4d is a schematic diagram of electrode patterns of a fingerprint sensing electrode group according to an embodiment of the present invention.

Referring to FIG. 4d, the electrode pattern is based on that in FIG. 4b, with one difference being that, after the first conductive structure 51 made of a transparent electrode material is formed, a printed metal mesh segment 54 is first formed on the surface of the first conductive structure 51 to reduce the overall resistance of the first conductive structure 51. The remaining parts are identical to the corresponding parts in FIG. 4a, and shall be omitted herein.

Figure 4E:
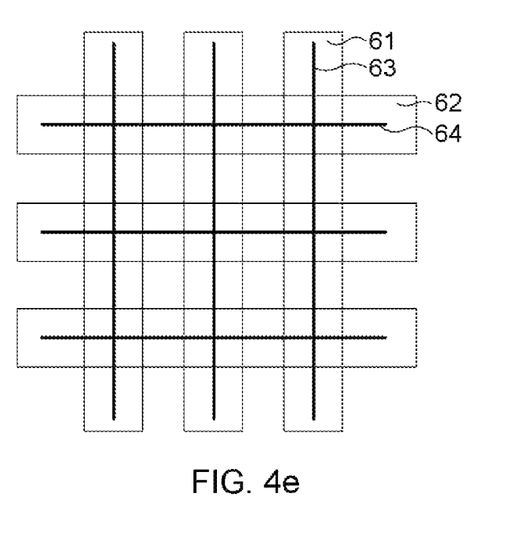
FIG. 4e is a schematic diagram of electrode patterns of a fingerprint sensing electrode group according to an embodiment of the present invention.

In FIG. 4a to FIG. 4d, an electrode pattern of an auxiliary conductive structure is additionally provided on the fundamental stacked structure in FIG. 2b. However, the present invention is not limited to these examples. Alternatively, the auxiliary conductive structure may also be applied to the stacked structures in FIG. 2a and FIG. 2c. For example, FIG. 4e is an electrode pattern developed based on the stacked structure in FIG. 2c. In FIG. 4e, a first conductive structure 61 and a second conductive structure 62 are made of a transparent material, and metal mesh segments 63 and 64 are respectively printed on the first conductive structure 61 and the second conductive structure 62 to reduce the overall resistance of the first conductive structure 61 and the second conductive structure 62, thereby improving an issue of unsatisfactory conductivity of a conventional double-layer ITO.

In conclusion, the technical means provided by the embodiments of the present invention are capable of satisfying both requirements of touch sensing and fingerprint sensing using the same capacitive sensing integrated circuit, hence achieving the primary object of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A capacitive sensing device, comprising:
    a substrate;
    a touch sensing electrode group, disposed above the substrate;
    a fingerprint sensing electrode group, disposed above the substrate, comprising:
        a first conductive structure comprising a plurality of parallel conducting lines;
        a second conductive structure;
        an insulation layer disposed between the first conductive structure and the second conductive structure; and
        an auxiliary conductive structure disposed on a same side of the insulation layer as the second conductive structure and above a gap of the parallel conducting lines, wherein the auxiliary conductive structure of the fingerprint sensing electrode group and the second conductive structure are made of a same material and are not in electrical contact with each other; and
    a capacitive sensing integrated circuit, electrically connected to the touch sensing electrode group and the fingerprint sensing electrode group, sensing a capacitance change in the touch sensing electrode group to generate a touch instruction, and sensing a capacitance change in the fingerprint sensing electrode group to generate a fingerprint pattern.

2. The capacitive sensing device according to claim 1, wherein the substrate is a transparent substrate that comprises a touch sensing electrode distribution region, the touch sensing electrode group is distributed in the touch sensing electrode distribution region, and the touch sensing electrode group comprises an insulation layer and two layers of conductive structures.

3. The capacitive sensing device according to claim 1, wherein the substrate comprises a fingerprint sensing electrode distribution region, and the fingerprint sensing electrode group is distributed in the fingerprint sensing electrode distribution region.

4. The capacitive sensing device according to claim 1, wherein the fingerprint sensing electrode group comprises an insulation layer and two layers of conductive structures.

5. The capacitive sensing device according to claim 4, wherein both of the two layers of conductive layers are metal mesh layers, or both are transparent electrode layers.

6. The capacitive sensing device according to claim 4, wherein the two layers of conductive structures are a metal mesh layer and a transparent electrode layer, respectively.

7. The capacitive sensing device according to claim 1, wherein an electrode distribution density of the fingerprint sensing electrode group is greater than an electrode distribution density of the touch sensing electrode group, and a position of the fingerprint sensing electrode group overlaps a position of the touch sensing electrode group.

8. The capacitive sensing device according to claim 1, wherein the substrate comprises a recess located above a position of the fingerprint sensing electrode group, a metal ring is formed on a sidewall of the recess, and the metal ring is electrically connected to the capacitive sensing integrated circuit and is provided with a fixed voltage.

9. The capacitive sensing device according to claim 1, wherein the touch sensing electrode group, the fingerprint sensing electrode group and the capacitive sensing integrated circuit are all disposed above a same side of the substrate.

10. The capacitive sensing device according to claim 1, further comprising a metal mesh segment, which is disposed on the first conductive structure and in electrical contact the first conductive structure.

11. The capacitive sensing device according to claim 1, wherein the auxiliary conductive structure of the fingerprint sensing electrode group and the second conductive structure are made of a same material and are in electrical contact with each other.

12. A fingerprint sensing device, comprising:
    a substrate;
    a first conductive structure, disposed above the substrate, comprising a plurality of parallel conducting lines;
    a second conductive structure, disposed above the structure;

an insulation layer, disposed between the first conductive structure and the second conductive structure; and an auxiliary conductive structure, disposed on a same side of the insulation layer at as the second conductive structure and above a gap of the parallel conducting lines, wherein the auxiliary conductive structure and the second conductive structure are made of a same material and are not in electrical contact with each other.

13. The fingerprint sensing device according to claim 12, further comprising a metal mesh segment, which is disposed on the first conductive structure and in electrical contact with the first conductive structure.

14. The fingerprint sensing device according to claim 12, wherein the auxiliary conductive structure and the second conductive structure are made of a same material and are in electrical contact with each other.

* * * * *